United States Patent
Ward

(10) Patent No.: US 7,114,749 B2
(45) Date of Patent: Oct. 3, 2006

(54) SPLASH GUARD KIT AND ASSEMBLY

(76) Inventor: Douglas K. Ward, 9 Scenic Millway, Toronto, Ontario (CA) M2L 1S4

( * ) Notice: Subject to any disclaimer, the term of this patent is extended or adjusted under 35 U.S.C. 154(b) by 0 days.

(21) Appl. No.: 10/345,998

(22) Filed: Jan. 17, 2003

(65) Prior Publication Data
US 2004/0140664 A1    Jul. 22, 2004

(51) Int. Cl.
B62D 25/18    (2006.01)
(52) U.S. Cl. .................. 280/848; 280/847; 280/159; 280/154
(58) Field of Classification Search ............... 280/848, 280/849, 851, 159, 140, 847, 152.1, 152.3, 280/152.2, 154, 160; 296/198
See application file for complete search history.

(56) References Cited

U.S. PATENT DOCUMENTS

| | | | | |
|---|---|---|---|---|
| 3,953,053 A | * | 4/1976 | Arenhold | 280/851 |
| 4,062,580 A | * | 12/1977 | West | 293/128 |
| 4,264,083 A | * | 4/1981 | Matthew et al. | 280/851 |
| 4,268,052 A | * | 5/1981 | Sullivan | 280/848 |
| 4,315,634 A | * | 2/1982 | Arenhold | 280/851 |
| D274,324 S | * | 6/1984 | Arenhold | D12/185 |
| 4,524,986 A | * | 6/1985 | Ward | 280/851 |
| 4,629,204 A | * | 12/1986 | Arenhold | 280/851 |
| 4,709,938 A | * | 12/1987 | Ward et al. | 280/851 |
| 4,877,268 A | * | 10/1989 | Price | 280/851 |
| D305,321 S | * | 1/1990 | Iacovelli | D12/185 |
| D316,536 S | * | 4/1991 | Charet et al. | D12/185 |
| 5,048,868 A | * | 9/1991 | Arenhold | 451/59 |
| 5,120,082 A | * | 6/1992 | Ito | 280/851 |
| 5,238,268 A | * | 8/1993 | Logan | 280/848 |
| 5,407,229 A | * | 4/1995 | Garrett | 280/851 |
| 5,489,108 A | * | 2/1996 | Slade | 280/152.3 |
| 5,722,690 A | * | 3/1998 | Ward et al. | 280/851 |
| D415,460 S | * | 10/1999 | Ward et al. | D12/185 |
| D431,509 S | * | 10/2000 | Lund | D12/190 |
| 6,193,278 B1 | * | 2/2001 | Ward et al. | 280/848 |

FOREIGN PATENT DOCUMENTS

GB    2159785    6/1985

* cited by examiner

Primary Examiner—Christopher P. Ellis
Assistant Examiner—Vaughn T. Coolman
(74) Attorney, Agent, or Firm—Watts Hoffman Co, LPA

(57) ABSTRACT

A splash guard assembly for an over the highway vehicle and a kit for making the assembly are disclosed. The assembly includes a contoured splash guard and an intermediate mounting element for positioning between the splash guard and a vehicle side panel. The guard and the element are complementarily contoured to fit together. The element is also contoured to fit a specific vehicle panel adjacent a wheel well of a vehicle having such panel. When assembled the element and panel are interconnected to enable mounting of the guard. Fasteners securing the element and guard together and the element to the panel.

7 Claims, 3 Drawing Sheets

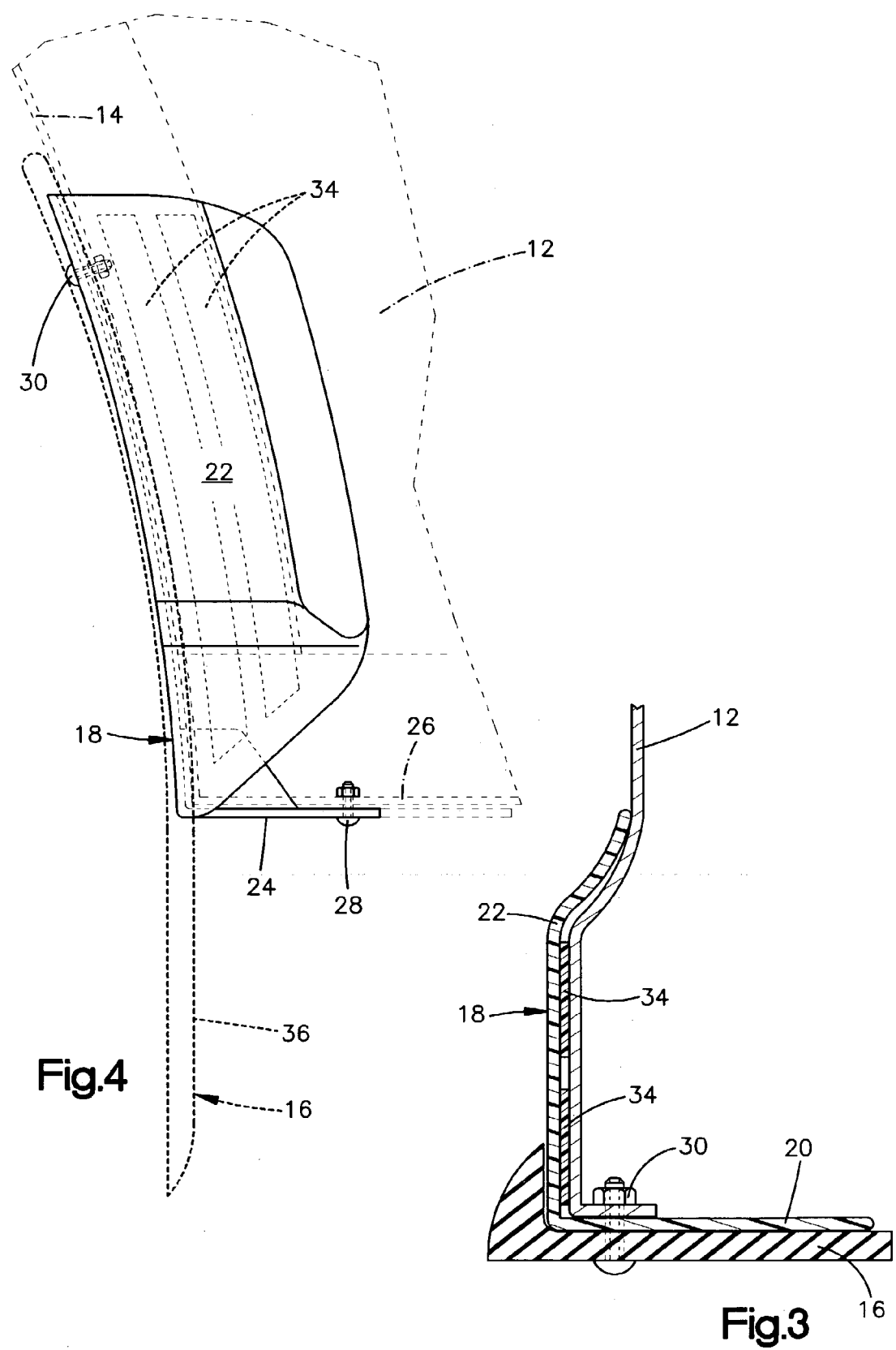

SPLASH GUARD KIT AND ASSEMBLY

This invention relates to splash guards and more particularly to a splash guard assembly suitable for mounting on molded plastic side panels of automobile vehicles.

BACKGROUND OF THE INVENTION

Vehicle splash guards, sometimes referred to as mud flaps, have been used on automobiles for many years. Historically, splash guards were products purchased in the after market and mounted by auto owners on their vehicles. While splash guards are intended to reduce spray to following vehicles but, at least with automobiles, they are often purchased and installed to protect the finish and undercarriage of the vehicle on which they are mounted.

In recent years, manufacturers have supplied customized splash guards which are specifically contoured and designed to fit specific vehicles. After market suppliers manufacturers responded by producing splash guards which gave the appearance of being customized as taught and claimed in U.S. Pat. No. 4,709,938 issued Dec. 1, 1987 to Douglas K. Ward et al.

Vehicle manufacturers strive to reduce fuel consumption so that vehicles can be economically operated. Reductions in the weight of vehicles have contributed significantly to the improvement in economical operations. Many of the weight reductions have been achieved by substituting plastic materials for metal, most notably steel. At least one model vehicle to be introduced to the market presently has side panels which are molded from plastic material which is superior to steel at least from the stand point of resistance to corrosion and reduced weight.

A disadvantage of the plastic panels is that at least those portions of the side panel immediately adjacent the rear wheel well do not have sufficient rigidity and flange width for satisfactory mounting of a splash guard by conventional techniques. As a consequence there is a need for a splash guard assembly which has a structure which provides reinforcement of a side panel thereby making the mounting of a splash guard on a panel defined wheel well both possible and attractive.

SUMMARY OF THE INVENTION

The present invention is directed to a splash guard assembly and to a kit for making such an assembly. The assembly includes a contoured splash guard which is specifically designed for mounting in a rear wheel well on a specific vehicle panel. The specific vehicle panel is a molded plastic component which has inturned flanges at the base of the panel and delineating a rear portion of the wheel well. The assembly includes an intermediate mounting element which is designed to fit a specific panel and a specific splash guard such that the intermediate element secures the splash guard to the panel and at the same time reinforces the panel which otherwise would not adequately and properly support a splash guard.

The intermediate mounting element includes a portion which is disposed transversely of the vehicle when the element is mounted on the panel. It includes a further portion which overlies and is secured to a face of the panel. Thus, when mounted the intermediate mounting element serves both to provide appropriate surfaces for the mounting engagement of the splash guard and other surfaces for mounting engagement of the element on the panel while stiffening the panel to provide an appropriate support for the splash guard.

The portion of the mounting element which overlies the panel has a smooth external surface which preferably is finished in a color either matching, or compatibly contrasting with, the color of the vehicle panel on which it is mounted.

Accordingly, the objects of the invention are to provide a novel and improved splash guard assembly, a kit for producing such an assembly and a method of mounting a splash guard on a plastic panel.

BRIEF DESCRIPTION OF THE DRAWINGS

In the drawings:

FIG. 3 is a cross sectional view of the vehicle panel and the splash guard assembly as seen from the plane indicated by the line 3—3 of FIG. 2; and, FIG. 4 is a side elevational view of the mounting element with a portion of the panel and the splash guard being shown in phantom all as seen from the plane indicated by the line 4—4 of FIG. 2.

DETAILED DESCRIPTION OF THE INVENTION

Figure 1:
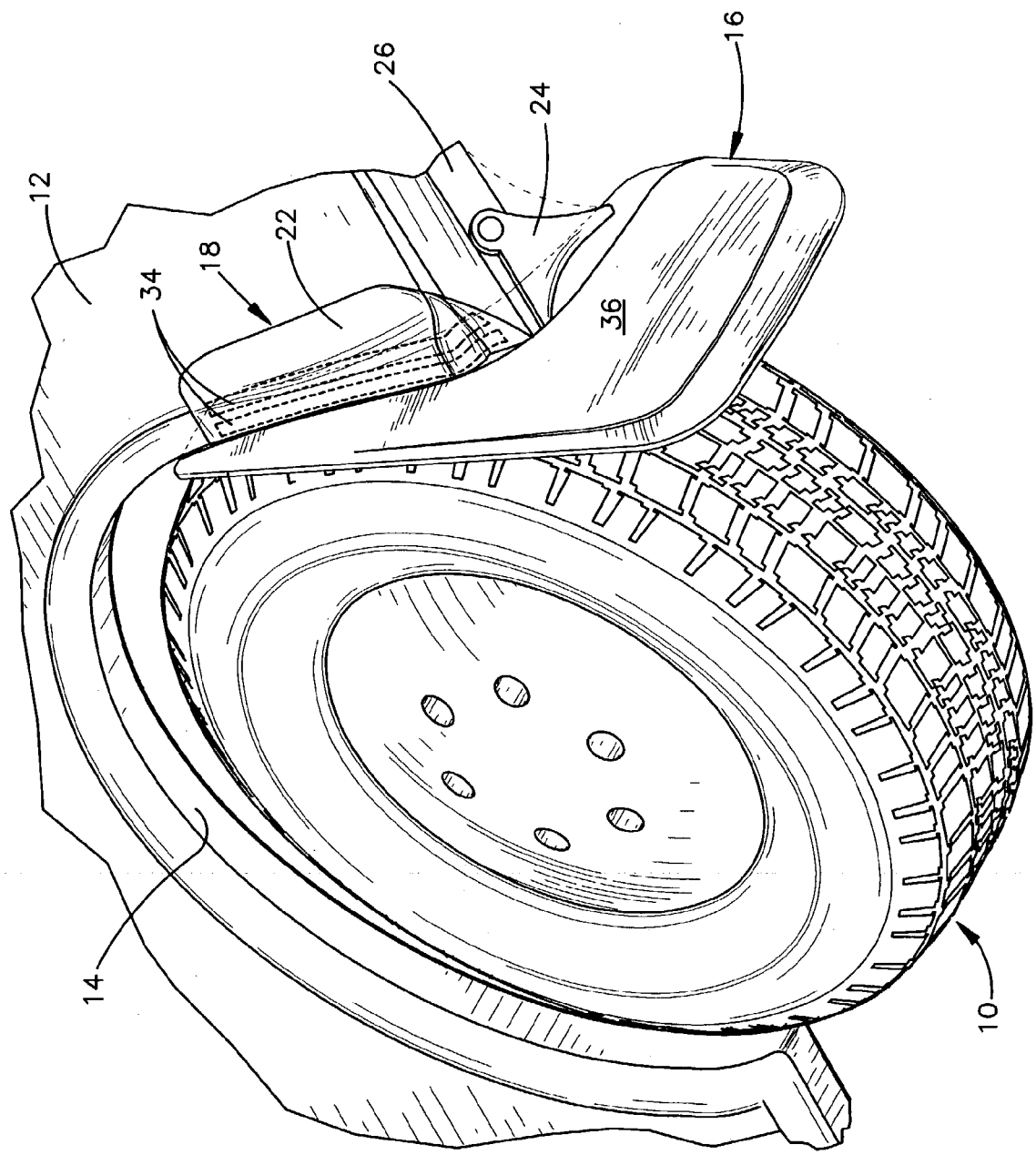
FIG. 1 is a perspective view taken from below and to the rear and one side of a wheel well equipped with a novel splash guard assembly.

Referring to the drawings and FIG. 1 in particular, a vehicle wheel is shown generally at 10. A portion of a rear side panel 12 includes an inturned flange 14 delineating the perimeter of an entrance to a wheel well in which the wheel is mounted. A splash guard 16 is positioned behind the wheel 10 to function to protect the panel 12 and the underside of the vehicle from splash and debris thrown up by the wheel.

Figure 2:
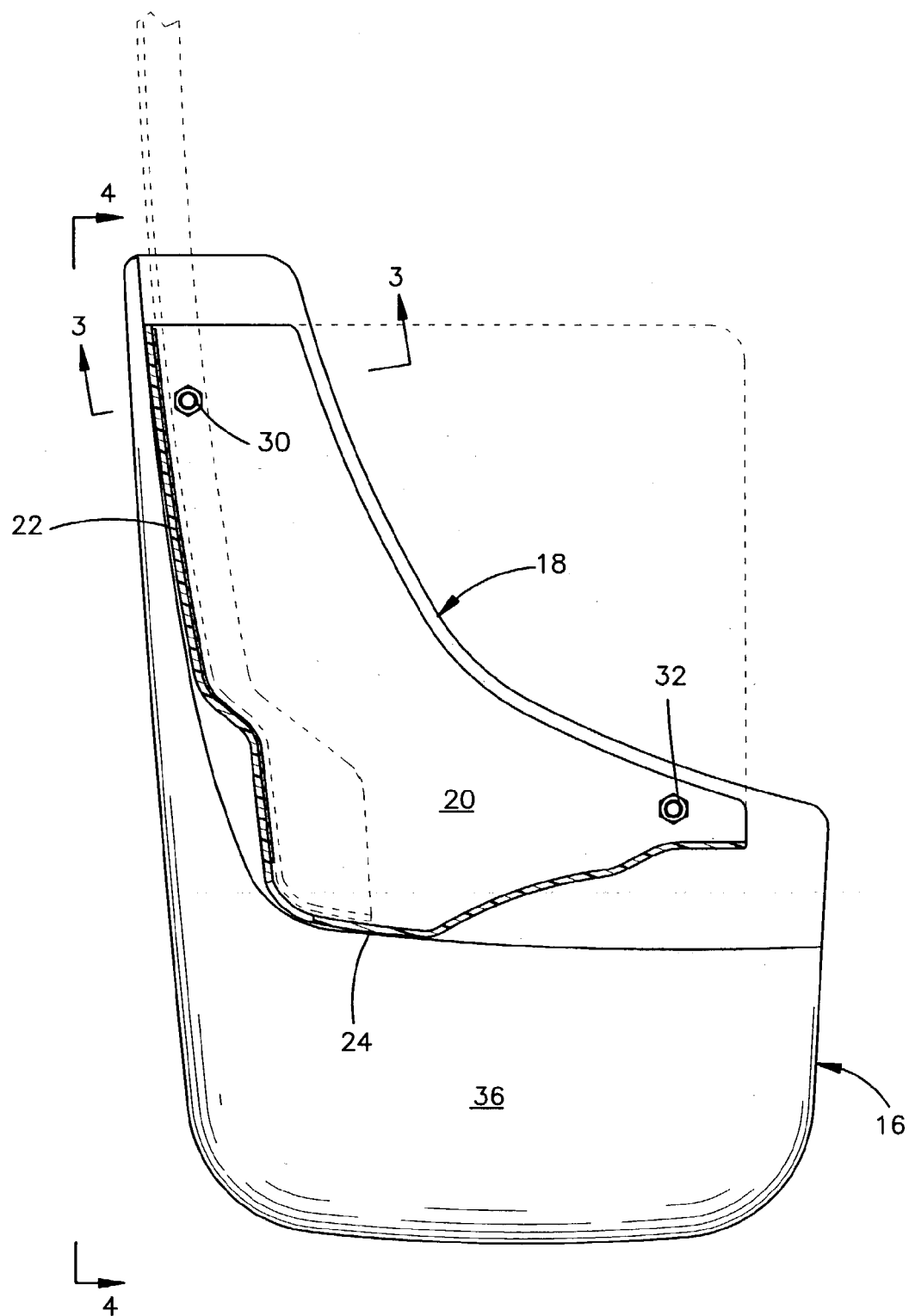
FIG. 2 is rear elevational view of the splash guard and a sectional view of the splash guard mounting element with a vehicle side panel shown in phantom.

A reinforcing and mounting element 18 is provided. The element 18 includes a splash guard mounting portion 20 shown in elevation in FIG. 2. The mounting portion 20 optionally may extend inwardly as shown in dotted lines in FIG. 2 to provide an inner fender for spray blockage. The mounting element 20 also includes a panel reinforcement portion 22 which overlies and is secured to a mounting section of the face of the panel 12.

The mounting element 18 further includes a base portion 24 which extends inwardly at about 90 degrees from the mounting portion 20. The base portion 24 is in underlying abutment with and secured to a panel lower flange 26 as by a threaded fastener 28. As indicated in phantom in FIG. 4, the base portion 24 may extend further rearwardly to add to the stability of the assembly and further reinforce and stiffen the lower flange 26.

The mounting element also engages and is secured to the wheel flange 14 by another threaded fastener in the form of a nut and bolt 30. The fastener 30 also functions to secure the splash guard 16 to the mounting portion 20 of the element 18. A further fastener in the form of a nut and bolt 32 also functions to secure the splash guard 16 to the mounting portion 20 of the element.

In the disclosed arrangement, the panel reinforcement portion 22 of the mounting element 18 is secured to the face of the panel 12 by double sided tape 34. The tape is similar if not identical to tapes sold commercially as carpet tape which have adhesive on opposed face surfaces. Thus the opposed adhesive layers respectfully bond to an innersurface of the panel reinforcement 22 and an outer surface of the panel 12 to secure the two together. The tape is preferably of the type having a foam core between adhesive bearing layers.

The assembly of the present invention enhances the appearance of the vehicle. While typical splash guards are black this splash guard can be of other and contrasting or matching colors. Similarly the reinforcement portion 22 of the element 18 will be finished in a color that either matches or is pleasingly contrasting with the finish applied to the vehicle panel 12. Further, a rear face of a depending portion 36 of the splash guard may carry a printed message such as the name of the vehicle manufacturer or model or a decorative configuration, all as is conventional in splash guards.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

I claim:

1. A kit for a splash guard assembly for an over the highway vehicle comprising:
   1) a contour splash guard;
   2) a separate intermediate mounting element for positioning between the splash guard and a vehicle side panel;
   3) the guard and the element being complementally contoured to fit together;
   4) the element also being contoured to fit a specific vehicle panel adjacent a wheel well of a vehicle having such panel;
   5) the element being affixed to the panel at multiple positions to enable mounting of the
   6) the element and guard including means to connect them together when the element is mounted on a panel; and
   7) a separate base portion extending transversely from the element, said separate base portion is being secured to said panel by a plurality of fasteners, wherein said plurality of fasteners are oriented such that a first fastener is attached to the panel in a longitudinal direction and second fastener is positioned in a relatively transverse direction to provide reinforcement to said panel.

2. The kit of claim 1 wherein said intermediate mounting element extends inward relative to said wheel well to provide protection to an inner fender for spray blockage.

3. The kit of claim 1, wherein said fasteners are threaded fasteners.

4. A splash guard assembly for an over the highway vehicle comprising:
   1) a contoured splash guard;
   2) a separate intermediate mounting element for positioning between the splash guard and a vehicle side panel;
   3) the guard and the element being complementally contoured to fit together;
   4) the element also being contoured to fit a specific vehicle panel adjacent a wheel well of a vehicle having such panel;
   5) the element being affixed to the panel at multiple positions to enable mounting of the guard; and
   6) including fastener means securing the element and guard together, wherein said element further comprises a separate base portion transversely secured to said panel by a plurality of fasteners, further wherein said plurality of fasteners are oriented such that a first fastener is attached to the panel in a longitudinal direction and second fastener is positioned in a relatively transverse direction to provide reinforcement to said panel.

5. The splash guard assembly for an over the highway vehicle of claim 4, wherein said plurality of fasteners are threaded fasteners.

6. The splash guard assembly for an over the highway vehicle of claim 5, wherein said intermediate element extends inward relative to said wheel well to provide protection to an inner fender for spray blockage.

7. A kit for a splash guard assembly for an over the highway vehicle comprising:
   1) a contour splash guard;
   2) a separate intermediate mounting element for positioning between the splash guard and a vehicle side panel;
   3) the guard and the element being complementally contoured to fit together;
   4) the element also being contoured to fit a specific vehicle panel adjacent a wheel well of a vehicle having such panel;
   5) the element being affixed to the panel at multiple positions to enable mounting of the
   6) the element and guard including means to connect them together when the element is mounted on a panel; and
   7) a separate base portion having;
      i) a first plane extending transversely from said element toward the rear of said vehicle, said first plane connected to a lower flange of said panel by a threaded fastener for adding stability and reinforcement to said flange;
      ii) a second plane extending transversely from said element toward the center of said vehicle for adding support to said element and said guard; and
      iii) a third plane extending substantially orthogonal from said first and second planes, said third plane connected to said element by a threaded fastener, thereby adding stability and reinforcement to said guard and element.

* * * * *